(12) United States Patent
Richard et al.

(10) Patent No.: US 6,518,545 B1
(45) Date of Patent: Feb. 11, 2003

(54) WELDING ARC PENETRATING POWER REAL-TIME DETECTION SYSTEM

(75) Inventors: Claude Richard, Villers-Cotterêts (FR); Gilles Richard, Villers-Cotterêts (FR)

(73) Assignee: Serimer Dasa (FR)

( * ) Notice: Subject to any disclaimer, the term of this patent is extended or adjusted under 35 U.S.C. 154(b) by 0 days.

(21) Appl. No.: 09/513,680

(22) Filed: Feb. 25, 2000

(51) Int. Cl.$^7$ .................................................. B23K 9/10
(52) U.S. Cl. ..................................... 219/130.21; 219/61
(58) Field of Search ...................... 219/130.33, 130.32, 219/130.31, 130.21, 130.51, 137 PS, 130.01, 61, 60 A, 60 R, 125.11, 124.02, 124.03, 124.22, 124.34

(56) References Cited

U.S. PATENT DOCUMENTS

| | | | | |
|---|---|---|---|---|
| 3,264,447 A | * | 8/1966 | Agnew .................. | 219/124.22 |
| 3,567,899 A | * | 3/1971 | Iceland et al. ......... | 219/124.34 |
| 3,694,621 A | * | 9/1972 | Wofsey .................. | 219/124.03 |
| 3,702,915 A | * | 11/1972 | Vilkas et al. .......... | 219/137 PS |
| 4,631,385 A | * | 12/1986 | Rothermel ............. | 219/124.03 |
| 4,711,986 A | * | 12/1987 | Lillquist et al. ....... | 219/130.21 |
| 6,124,566 A | * | 9/2000 | Belloni et al. ......... | 219/124.34 |

* cited by examiner

Primary Examiner—Clifford C. Shaw
(74) Attorney, Agent, or Firm—Sheridan Ross P.C.

(57) ABSTRACT

A process for control of a butt welding of tubes is disclosed wherein readily measurable parameters of a process of welding are read, voltage and current, and parameters such as impedance or time interval across a portion of a pulse are derived from the voltage and current. The derived values are then used in conjunction with parameters of the welding machine to set the values of the welding machine and the torch or torches connected to it to control the power of penetration of a welding arc for no piercing but with penetration.

35 Claims, 8 Drawing Sheets

WELDING ARC PENETRATING POWER REAL-TIME DETECTION SYSTEM

BACKGROUND OF THE INVENTION

1. Field of the Invention

An arc welding process for butt welding of parts, especially designed for orbital butt welding of tubes for piping applications.

2. Brief Description of the Prior Art
1. Preliminary

Welding has been used for many years. As it is well know in the art, when butt welding parts, the items to be welded must be held in position relative to one another. In the case of the parts being tubes welded together, a clamp is used for this purpose, generally placed inside the tubes and positioned at the junction of the two tubes. This clamp is equipped with rows of pistons, each row holding a tube.

The ends of the parts to be welded may first be chamfered 50 (depending on the thickness of the parts, the arc welding process used, the procedure—automatic or manual—and the like), to form ring 13. See FIGS. 1 and 2 for illustrations of the prior art components that are welded together.

2. Welding Principle

The process used for butt welding parts of the present invention is the MIG/MAG or GMAW metal arc welding with gas shield process. A metal wire 25 is connected at the weld torch 11 to one of the polarities of a power source and is fed to the welding location. An electric arc is created between this wire and the parts to be assembled, which parts are at the polarity different from that of the wire polarity (See FIG. 5 for an illustration of the prior art equipment and process discussed in more detail below).

The electric arc causes the wire (sometimes referred to as the "filler metal") to melt, as well as partial melt of the parts to be assembled. The wire feed rate (called $V_f$) is made equal to its melt rate so as to provide for a stable arc. The first weld bead, which produces a perfect joint at the inner skin (with admissible imperfections according to implemented standard) between two chamfered parts is know as "the penetration pass."

The current wave delivered by the generator is either continuous or sequential. Arc welding is a periodic phenomenon whose period is a few hundredths of a second. During the welding process, the electrical parameters therefore also vary in a periodic fashion.

The current and voltage waveforms of the welding arc change according to the type of transfer of the weld metal from the filler metal (See FIGS. 3 and 4).

3. Types of Generators Used

MIG/MAG arc welding generators capable of generating sequential type arc modes (including the pulse and/or controlled short-circuit modes) illustrate the ability to have controlled waveforms as shown in FIGS. 3 and 4.

Parameters adjustable by the operator on such generators as shown in FIGS. 3 and 4 are:

Ipeak 1, Ibase 2, Upeak 3, Ubase 4, peak time 5, up ramp 6, down ramp 7 (depending on source manufacturers), $V_f$, frequency (inverse of cycle 51) (adjustable or self-regulated), cool time 8 (adjustable or self-regulated).

In automatic welding, overall parameters managed by the program logic controller ("PLC") are:

Welding unit speed (equivalent to welding speed), oscillation amplitude and frequency of the welding torch.

For Sequential mode: pure pulse mode (FIG. 3), the pulse phase corresponds to the Ipeak dwell time 5.

For Sequential mode: controlled short-circuit (FIG. 4), Upeak: peak voltage. Voltage value 3 at which the current stops increasing, i.e. voltage at the inception of Ipeak 1. Umax 9: maximum achieved voltage. This is a phenomenon due to system inertia.

The pulse phase starts when the voltage becomes equal to Upeak and ends at the end of Ipeak.

In such generators, an intelligent system (microprocessor+programmable logic device, for example) allows certain parameters (Ipeak, frequency, cool time, and the like) to be adapted in real time according to the weld pool conditions (thermal emissivity of the weld pool, for example).

4. For Tube Welding (Penetration Pass), Several Techniques are Available

None of the techniques presented below makes use of real-time, self-assessment of the penetrating power of the electric welding arc.

a. Welding from the Inside:

An inner welding clamp is used. The clamp is usually equipped with two rows of pistons to hold the tubes in position. Further, mobile welding torches are mounted on the clamp for the purpose of completing the penetration from the inside. Parameters can be changed to fit predefined angular positions. The problem with this are that implementing this device is a complex process (positioning in the mating plane is difficult, centering of the welding torches, no direct check possible during welding, poor cost-effectiveness, complex machine with limited diameter range, and the like).

b. Welding from the Outside:

(1) For high wire feed rates, e.g. in the case of mechanized or automatic welding where the welding head movements are controlled by a carriage-type electromechanical assembly, the weld pool must be maintained using backing strips (copper, ceramics, and the like) to prevent the weld pool from collapsing. The backing strips are slaved to the piston rows and applied flat against the back of the joint to be welded when the pistons extend. During welding, parameters can be changed to fit predefined angular positions. The problem is that regardless of the type of medium, the backing strips gradually deteriorate as welding passes accumulate with current MIG-MAG type arc welding processes.

(2) In manual welding, or in automatic welding at low wire feed rates, the outside can be welded without backing strips. The welders are generally assisted by an operator who is requested to adjust the mean welding current according to the weld pool behavior. The problem is that low output occurs, with a welder-dependent process.

In the prior art, whether welding from the outside or from the inside, the welding parameters can be regulated according to the weld pool conditions (temperature, luminosity . . . etc.) or the bevel shape (width, gap, high-low . . . etc.) to control the penetration. To do so, some sensors (thermographic vision, laser, camera, pictures/vision analysis and the like) are available and can be used to measure the thermal evolution of the weld pool, the bevel shape evolution, and the like in real time while welding.

But these devices which need to be handled by the welding system are more cumbersome, fragile, expensive, and less time responsive to adapt the parameters.

5. Example of Configuration of Automatic Outside Welding

As shown in FIGS. 5 and 13, a motor-driven welding unit 10 is mounted on fixed tube 12 by means well known in the art. It is connected to a welding generator 14 and a wire reel 15. It is equipped with one or several welding torches 11 and moves along a ring 13 integral with the fixed tube 12, the welding unit 10 welds, for example, a half-circumference of ring 13.

6. General Problems Experienced When Completing the Penetration Pass a. A Requirement Exists to Control Weld Pool Fluidity in all Positions (Orbital Welding).

Fast cooling is controlled by varying the welding arc heat input. With no support, or with a support made of a low thermal conduction material, cooling of the weld pool during the penetration pass is slower than on a metal support (such a copper). The weld pool must therefore otherwise cool off fast enough to limit the effect of gravity on the fluid pool, thus preventing it from collapsing and avoiding gaps, overpenetration and concavity.

b. The Electric Arc Penetrating Power Varies as a Function of Angular Position.

Even under perfect pipe fit-up conditions (no gaps or high-low areas), the penetrating power of an electric arc is not constant. According to the local angular tilt of the interface of the parts to be welded, the position of the weld pool relative to the arc varies. Thus, for example, for tube welding, at the 12 and 6 o'clock positions, the weld pool is located vertically juxtaposed to the arc, as it is pushed away by the arc pressure: in this case, the arc penetrating power into the metal is high.

Conversely, at the 3 and 9 o'clock positions, the weld pool tends to run under the arc, owing to gravity, as the pressure exerted by the arc is not always adequate, according to the pool fluidity, to push the weld pool back. The arc penetrating power is therefore reduced as compared to the 12 and 6 o'clock positions, under comparable fit-up conditions.

c. Penetration is Harder to Achieve on Fit-up Defects (See FIGS. 6. 7. 8 and 9 for Illustrations of Defects).

In the presence of fit-up defects (gap and/or high-low), the welding arc penetrating power naturally increases, and the weld pool cooling rate is slower (as side thermal pumping by the parent metal is less effective), and gaps may be created (owing to the lack of metal or collapse of the weld pool). When using backing strips, the backing strips may be severely damaged as the electric arc comes into contact with them.

d. Penetration is Harder when the Machining Dimensions of the Ends to be Assembled Vary.

The values of the various machined dimensions of the ends to be assembled, essentially those of the part to be fused during the penetration pass (usually referred to as the root face), i.e. the dimensions of the chamfers (FIG. 10) such as root face 21, lip 22, radius 20, must, as far as practicable, need to be accurate so as to ensure the quality in manual or automated welding. In production, however, the machining conditions for chamfers and the critical root face are often less than ideal and defects may occur. Thus, if the root face thickness is smaller and/or if the width of the lip is greater than nominal values, the ability of the parent metal to cool off the weld pool will be lessened and the electric arc penetrating power will subsequently increase, with the additional risk of creating defects such as gaps or collapsing, under substantially constant mean welding arc electrical parameters.

Conversely, if the root face is thicker and/or the lip narrower than the nominal values, the ability of the parent metal to cool off the weld pool will increase and the arc penetrating power decrease, but a risk exists that not all the parent metal will melt (i.e. the total thickness of the root face), thus creating a defect known as lack of penetration.

It is an object of the present invention to control the weld pool by simple sensory readings and to adapt the welding parameters to changes in the weld pool conditions.

It is a further object of the present invention to have such control using reliable sensors to consistently regulate in real time the weld pool conditions through the welding parameters.

SUMMARY OF THE INVENTION

A process for real-time assessment of the penetrating power of the electric welding arc during a butt weld penetration pass is disclosed. The penetrating power is defined as the ability of the electric arc to fuse the metal to be melted (usually referred to as the parent metal).

The purpose of the invention, based on real-time analysis of the welding arc waveforms (current, voltage), is to enable real-time assessment and adjustment of the welding arc penetrating power during the butt weld penetration pass.

The penetrating power changes constantly during the welding phase, and until now, welding current sources and waveform programming only took into consideration a mean penetrating power estimated for constant or steady state welding conditions (fit-up, chamfers). However, these conditions may change locally. Thus the piercing or collapse or burning through phenomenon is due to excessive welding arc penetrating power under given fit-up and local weld pool fluidity, and is detectable through real-time analysis of electrical parameters. Likewise, the lack of penetration phenomenon is due to a low welding arc penetrating power under given fit-up and local weld pool fluidity conditions, and is also detectable through real-time analysis of electrical parameters.

Both burning through and lack of penetration are unacceptable defects which require repair. Sequential modes provide for different weld pool fluidity and penetrating powers (high velocity of the metal transferred during the Ipeak current) according to programming of the waveform parameters (current, voltage, frequency, and the like). However, for given programmed parameters, stabilizing penetration is difficult, owing to the critical character of the thermal balance (heat input/removal) obtained under good fit-up and chamfer conditions, and to the differences of power levels necessary to achieve correct penetration under poor fit-up conditions or with poorly machined chamfers.

The invention will enable the arc mode and all the overall parameters of the installation to be slaved in real time so as to regulate the arc penetrating power and achieve constant penetration without backing or with backing (ceramics, copper, and the like) whether joint preparation is perfect or exhibits imperfections through the use of the voltage and the current of the welding machine.

DESCRIPTION OF THE DRAWINGS

For further understanding of the nature and objects of the present invention, reference is had to the following drawings in which like parts are given like reference numerals and wherein.

DESCRIPTION OF THE PREFERRED EMBODIMENT

1. Observation of Waveforms in the Case of a Piercing Arc and a Non-piercing Arc A non-piercing arc is defined as an arc whose penetrating power is sufficient to fuse the parts to be joined (i.e. to ensure penetration), but whose pressure, created by the arc power, exerted on the weld pool does not eject the melted metal before solidification. Conversely, a piercing arc is defined as an arc with high penetrating power, whose power is too high and ejects the melted metal with a risk of creating gaps or burn-through (the arc is said to have pierced).

Figure 1:
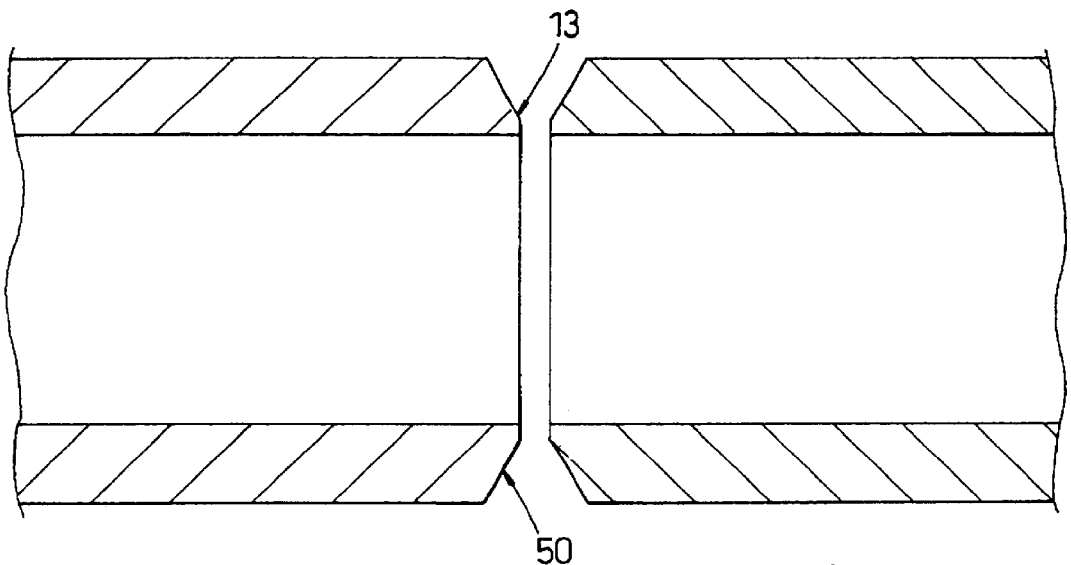
FIG. 1 is a side cross sectional view of two tubes forming a single-V groove (broad chamfer)
Figure 2:
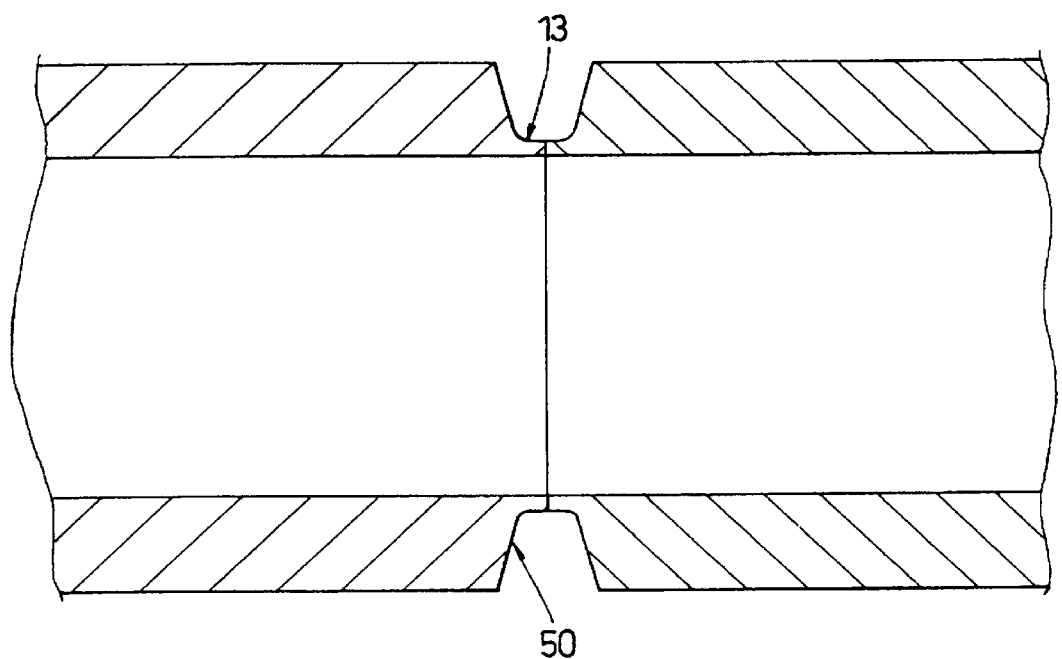
FIG. 2 is a side cross sectional view of two tubes forming a single-U groove (narrow chamfer)
Figure 3:
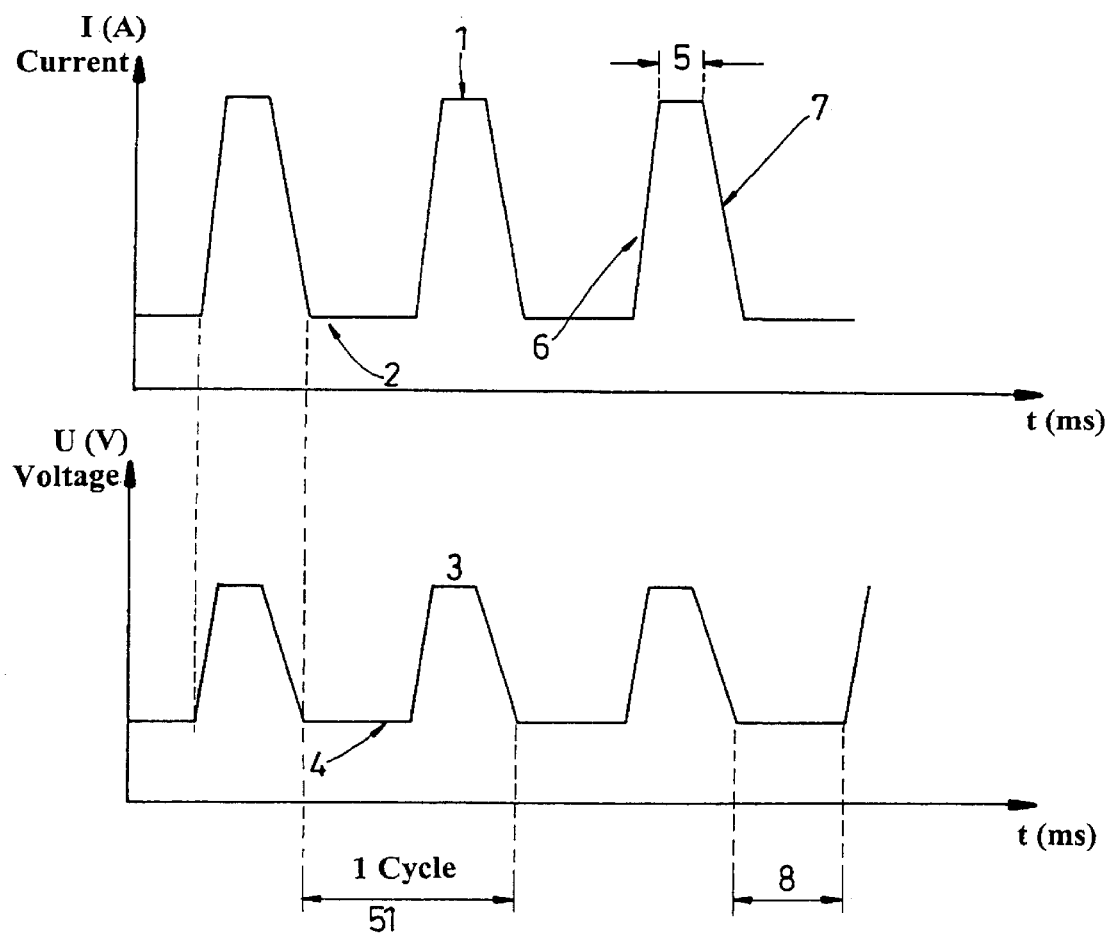
FIG. 3 is a graphic display of voltage and current versus time for a welding machine in sequential mode: pure pulse.
Figure 4:
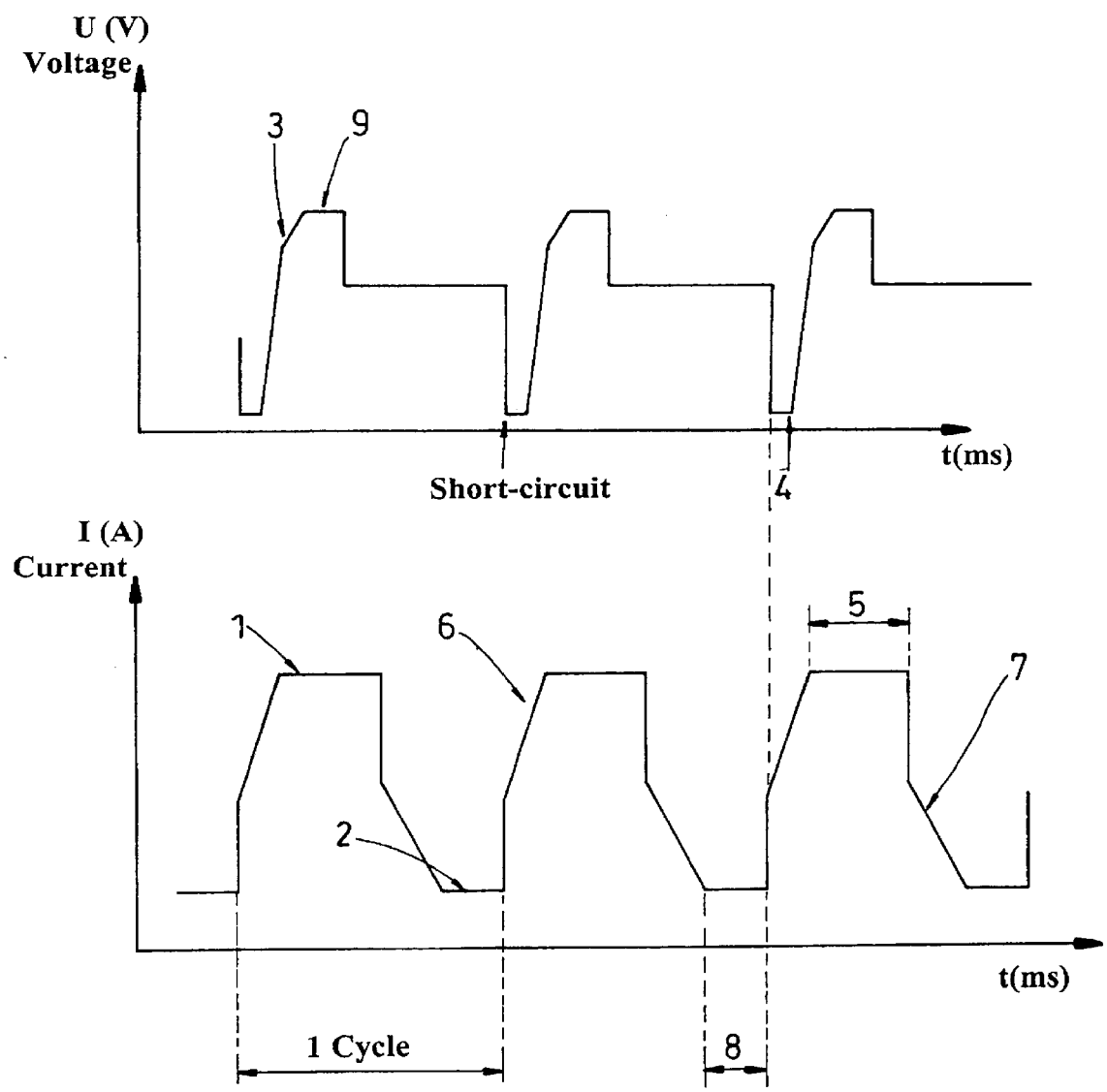
FIG. 4 is a graphic display of voltage and current versus time for a welding machine in sequential mode: controlled short-circuit.
Figure 5:
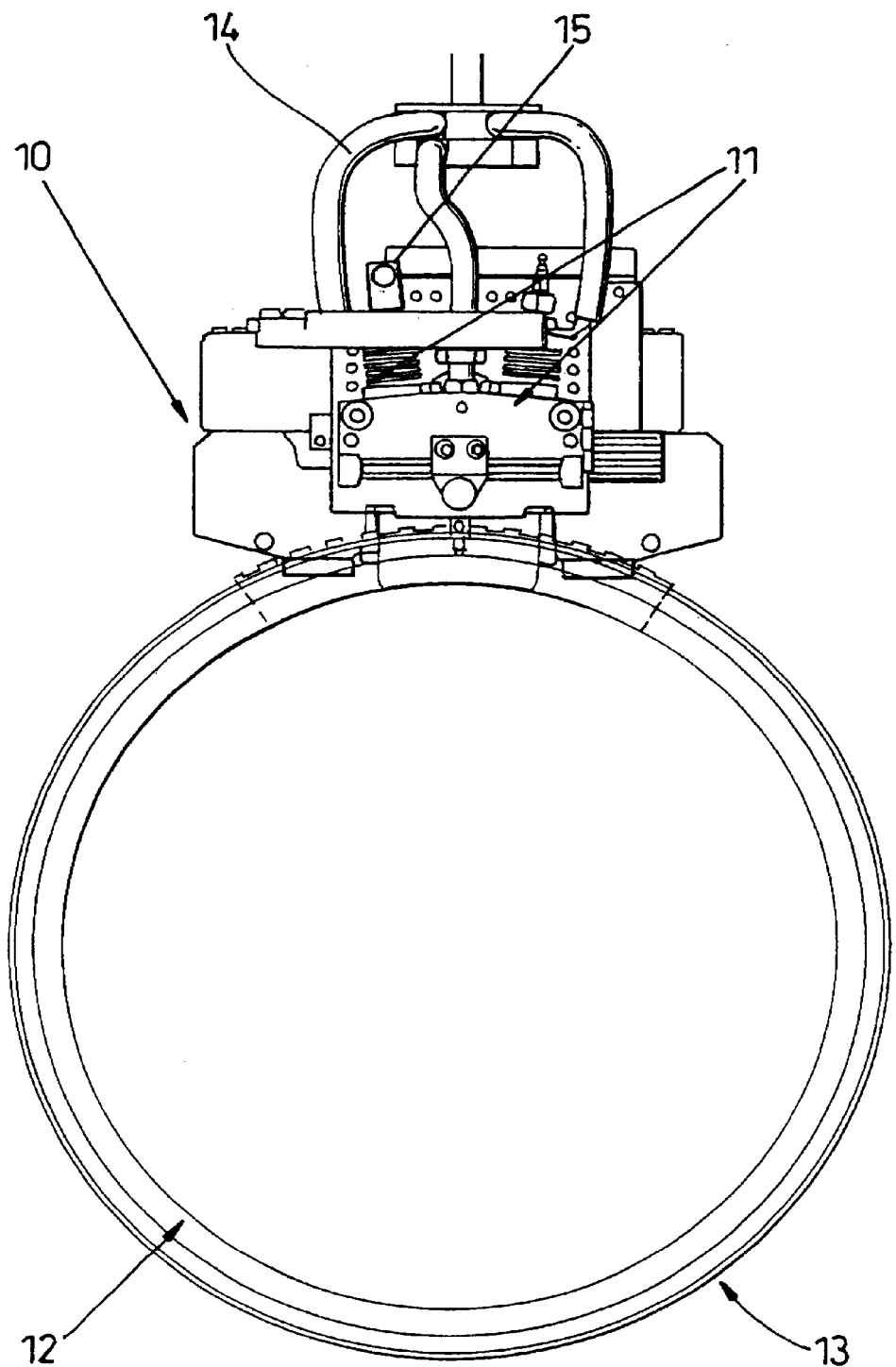
FIG. 5 is an end view of a motor driven welding unit of the prior art as shown mounted on the tube, partially in phantom line.
Figure 6:
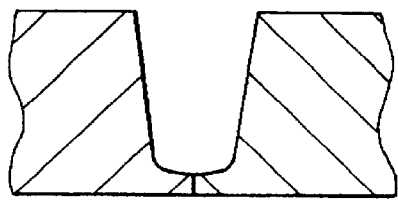
FIG. 6 is a partial, side cross-sectional view in cross section of two tubes as in FIG. 2, showing perfect fit-up.
Figure 7:
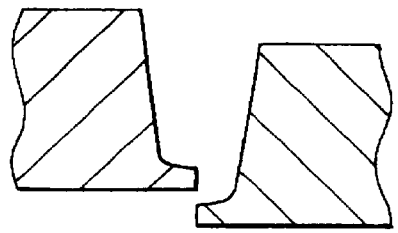
FIG. 7 is a partial, side cross sectional view of two tubes as in FIG. 2 in step fit-up.
Figure 8:
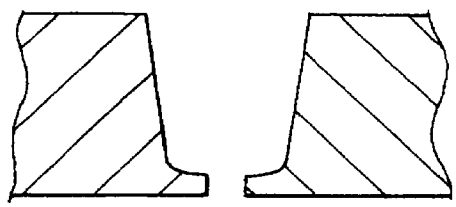
FIG. 8 is a partial, side cross sectional view of two tubes as in FIG. 2 showing fit-up with gap.
Figure 9:
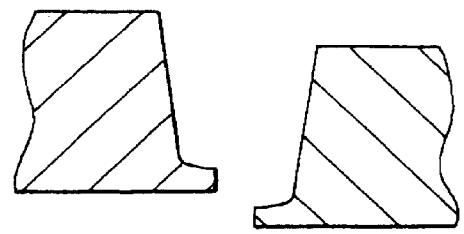
FIG. 9 is a partial cross sectional view of two tubes as in FIG. 2 showing fit-up with gap and step.
Figure 10:
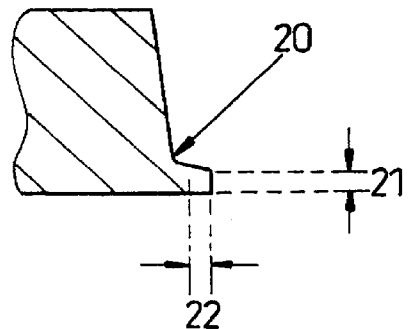
FIG. 10 is a partial cross sectional view of a single tube showing the various aspects of the section.
Figure 11:
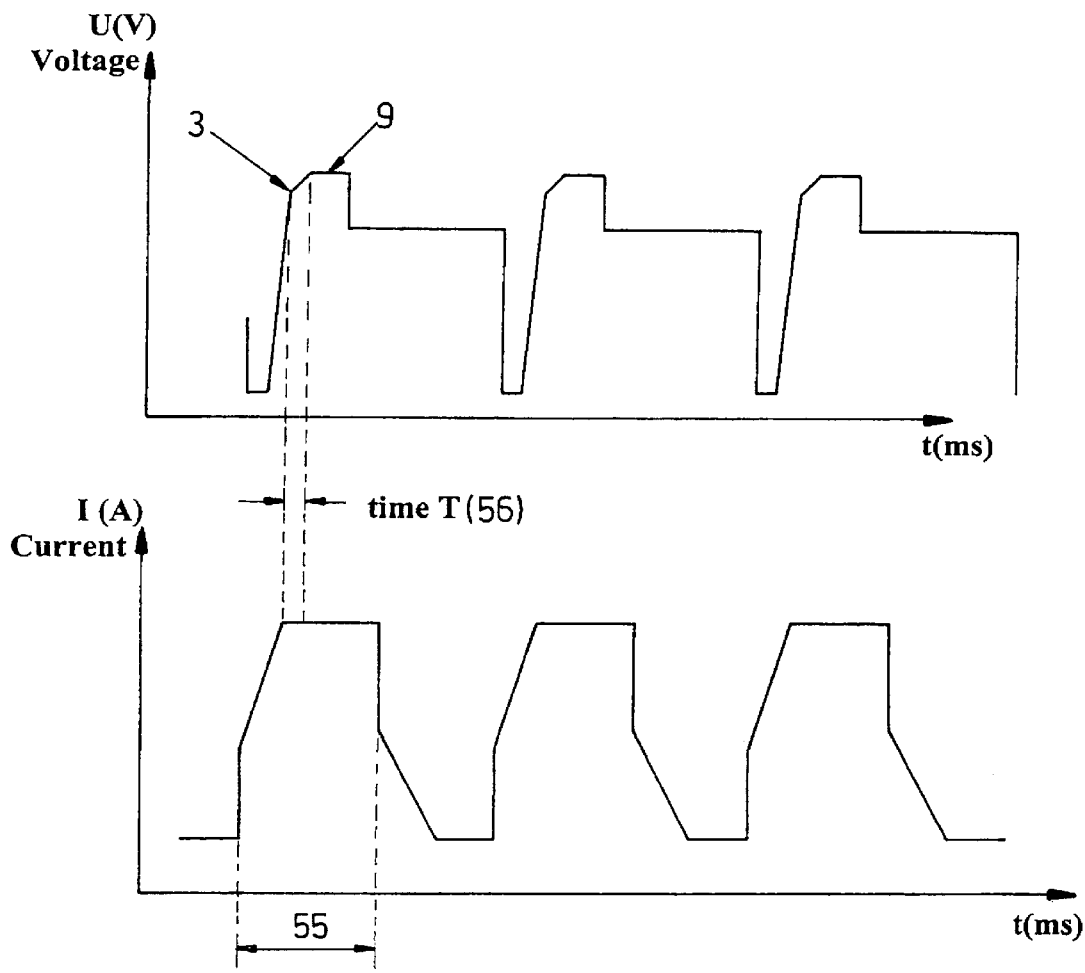
FIG. 11 is a graphic display of voltage and current waveforms versus time for a welding machine in mode-penetrating, non-piercing arc with low penetrating power.
Figure 12:
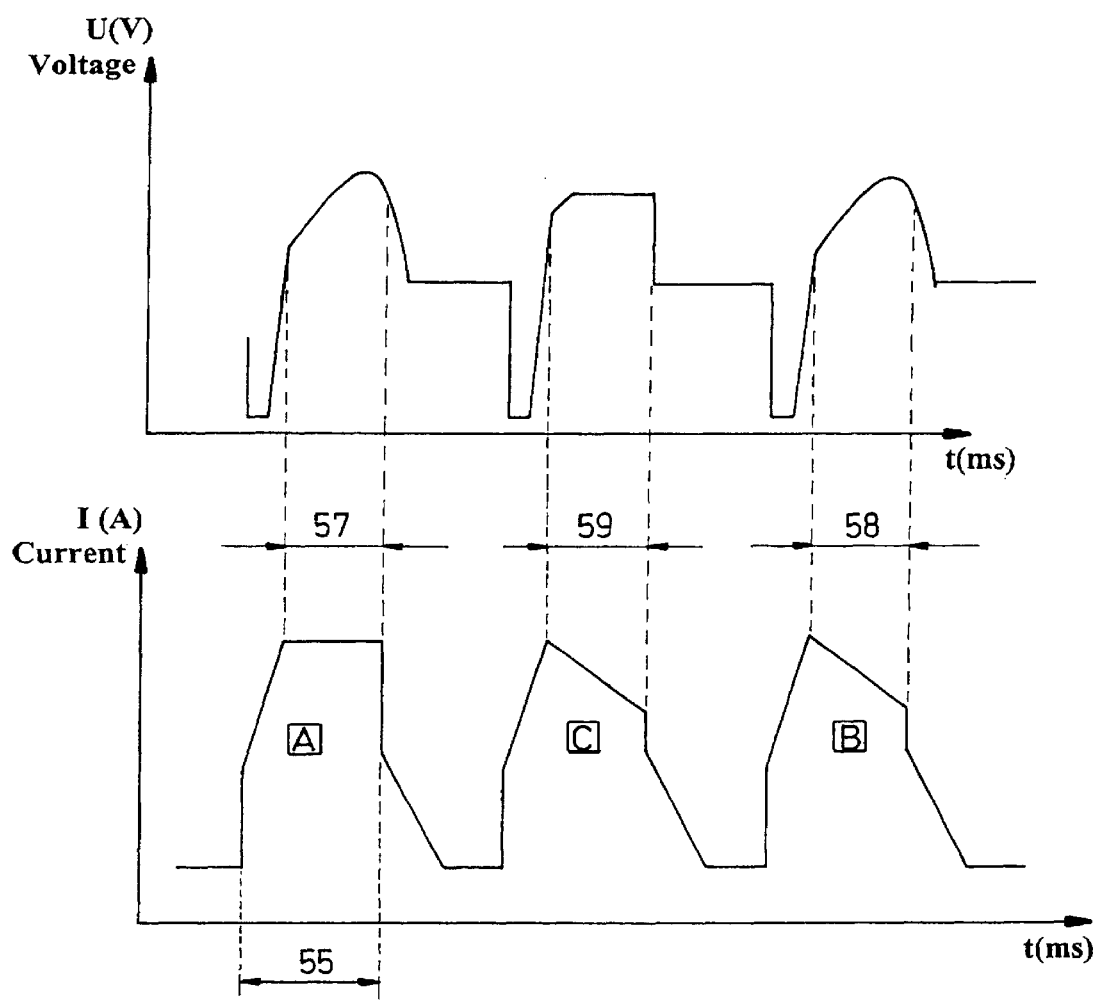
FIG. 12 shows a graph of voltage and current waveforms versus time for a welding machine in critical or high mode-piercing arc with high penetrating power, and illustrating different cases.

In the present invention, the voltage and current waveforms allow the electric arc penetration power to be determined (See FIGS. 11 and 12 for the extreme situation of lack of penetration potential (FIG. 11), with $\Delta Z < \Delta Z_o$ or $T < T_o$ and piercing (FIG. 12) with $T > T_r$ or $\Delta Z > \Delta Z_o$).

a. Normal Mode—Penetrating, Non-piercing Arc (FIG. 11).

During the pulse phase 55, voltage U and current I remain near constant. Thus, the ratio U/I=Z (impedance of the wire+arc system) remains near constant during the pulse phase. Time T56 to achieve maximum voltage-to-current ratio is very short.

b. Critical Mode—Piercing-arc (FIG. 12).

(1) For the "a" portion of FIG. 12, voltage increases during the pulse phase and current remains constant. The ratio U/I=Z increases between the beginning and the end of the pulse 55. Time T 57 to achieve maximum voltage-to-current ratio is long, and close to the pulse time (voltage rises slowly, which accounts for the fact that time T 57 becomes close to the pulse time).

(2) For the "b" portion of the FIG. 12, voltage increases and current drops between the beginning and the end of the pulse phase 55. The ratio U/I increases between the beginning and the end of the pulse. The instantaneous current drops and the voltage increases during the pulse phase. Therefore time T 58 is also close to the pulse time.

(3) For the "c" portion of FIG. 12, voltage remains near constant and current drops between the beginning and the end of the pulse phase 55. The ratio U/I increases between the beginning and the end of the pulse. The instantaneous current drops and voltage remains near constant during the pulse phase. Therefore, time T 59 is also close to the pulse time.

2. Assessment of Penetrating Power

Assessment is conducted using an electronic computer microprocessor 20 which provides general functions of reading instantaneous analog data 30 associated with the welding torch 11 operating on tube 12 with weld wire 25 forming arc 26, welding torch 11 mounted on welding unit 10 and connected to welding generator 14 and oscillator 16 and supporting wire 25 from reel 15. The analog data is converted to a digital representation 30 and then used in equations 31 discussed below to derive parameters from the data for calculations associated with time 32 for final calculation 33 of control signals. These signals are then converted from digital data to analog signals by a digital to analog converter 34. See FIG. 13.

Figure 13:
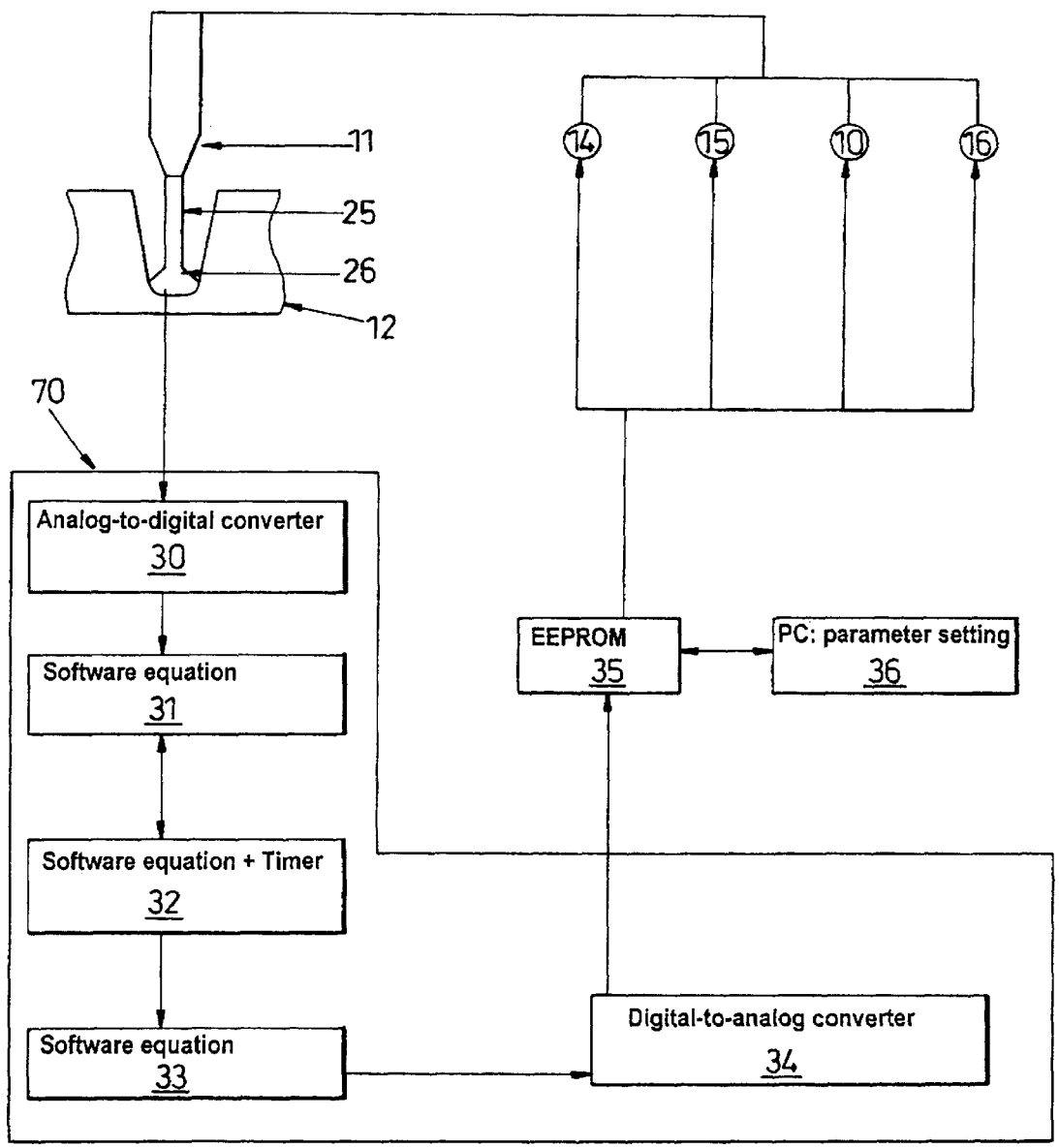
FIG. 13 shows a graphic representation of the preferred embodiment of the present invention showing control of the various parameters of a welding machine.

Several methods are available for assessing the arc penetrating power, in particular for detecting the time where the arc begins to pierce. As examples:

a. Assessment Mode No. 1 (FIG. 13)

Assessment is provided by the calculation of impedance, Z, of the wire 25 and arc 26 as a system during the pulse phase, through the equation:

$Z = U/I$, where  Z is the impedance of the wire + arc system
         I is the instantaneous current in the arc
         U is the instantaneous voltage in the arc Using an analog-to-digital converter 30, signals U and I taken from the electric arc 26 are acquired and processed. Then, using software-programmed equation the software 31 calculates impedance Z=U/I. The impedance is first measured at the beginning of the pulse, Z1; measurement starts at the time where voltage becomes equal to Upeak 3. When timer 32 expires, the impedance is measured a second time, Z2. The computer 70 then calculates the impedance variation, for example as follows:

$\Delta Z = Z2 - Z1$ $\Delta Z\% = 100 * (\Delta Z)/Z1$

A mean of $\Delta Z\%$ and $\Delta Z$ can be obtained over several cycles.

A reference $\Delta Z$, i.e. $\Delta Zr$ and $\Delta Zr\%$, is set based on experience, corresponds to a penetrating arc (non-piercing) with a fit-up exhibiting gaps and/or offset.

The measured $\Delta Z$ is compared 33 to $\Delta Zr$ and $\Delta Zo$ by computer 70.

An offset impedance $\Delta Zo$, set based on experience, corresponds to a penetrating arc (non-piercing) under coasting conditions exhibiting no gap, with a thick root face or reduced lips 21, 22.

$\Delta Z\%$ measured $\geq \Delta Zr\%$ indicates that penetrating power is very high, and the arc is piercing.

$\Delta Z_o\% < \Delta Z\%$ measured $< \Delta Zr\%$ indicates that the arc is in a proper operating zone and not piercing. However, penetrating power is all the higher as $\Delta Z\%$ measured a high.

3. Assessment Mode No. 2

Assessment is made by measuring the time since detection of Upeak 3 to achievement of Zmax (nulling of derivative dZ/dT).

The evolution of the wire+arc system impedance Z is measured by determining at what time the impedance Z is maximum Zmax 9.

Using the analog-to-digital converter 30, signals U and I taken from the electric arc 26 are acquired and processed. Then, using software-programmed equation 31, impedance Z=U/I is calculated.

Using a timer 32, time T is measured, i.e. the time between the beginning of the pulse and Zmax as calculated by computer 32 from the readings (which represents the nulling of derivative dZ/dT based on the curves of FIG. 12). This time T is, as a maximum, equal to the pulse time.

A mean of T can be obtained over several weld metal transfer cycles.

An offset time To, set based on experience, corresponds to a penetrating arc (non piercing) under coasting conditions exhibiting no gaps, with a thick root face or reduced lip 21, 22. A reference time Tr is, set based on experience, and corresponds to a penetrating arc (non piercing) under coasting conditions exhibiting gaps and/or offset.

Tmeasured is compared by software 33, using the equations, to Tr and To.

Tmeasured$\geq$Treference indicates that penetrating power is very high, and the arc is piercing.

To<Tmeasured<Tr indicates that the arc is in a proper operating zone and not piercing. However, the penetrating power is all the higher as T is high.

4. Regulation (See FIG. 13)

In the preferred embodiment of the present invention, assessment of the electric arc penetrating power permits control to occur through command control micro-processor 70. The purpose of control is to increase the arc penetrating power when the arc penetrating power is low, and to reduce it when the arc is piercing.

a. Control can be achieved by changing at least one of the parameters impacting the arc mode, such as Ipeak, Tbase, Upeak, and the like or parameters impacting the overall power level such as travel speed, and the like.

b. Control Principle

A welding program is loaded to a PC 36 and stored in the EEPROM 35 for use with the data produced by the command-control micro-processor 70. This welding control program is determined as follows:

| Start values (0% of weld complete) | End values (100% of weld complete) | Action on |
|---|---|---|
| $Ipeak_d$ | $Ipeak_f$ | |
| $Ibase_d$ | $Ibase_f$ | |
| $Upeak_d$ | $Upeak_f$ | |
| $Ubase_d$ | $Ubase_f$ | generator 14 |
| Rise time$_d$ | Rise time$_f$ | |
| Peak time$_d$ | Peak time$_f$ | |
| Down ramp$_d$ | Down ramp$_f$ | |
| Wire feed rate$_d$ | Wire feed rate$_f$ | reel 15 |
| Oscillation$_d$ | Oscillation$_f$ | oscillator 16 |
| Welding unit speed$_d$ | Welding unit speed$_f$ | welding unit 10 |

End values correspond to an arc mode with little penetration allowing welding to be completed on fit-up defects or in case of variations of machined end dimensions (thin root face, wide lip 21, 22) without causing the arc to pierce while ensuring penetration.

Start values correspond to an arc mode with high penetration allowing penetration to be ensured when fit-up is perfect, or in case of variation of machined end dimensions (thick root face, narrow lip 21, 22).

The evolution between start values and end values may be linear, for example, using a 0 to 10 V analog datum for input 30 comparisons representation.

c. Control Based on Assessment Mode No. 1

In the control system of the preferred embodiment, the analog signals from the digital-to-analog converter 34 are controlled by the comparison of $\Delta Z\%$ measured with $\Delta Z$ reference by the software equations 33.

If $\Delta Z\%$ measured$\leq 0$ then the analog signals are equal to 0V and the parameters are set to controls 10, 14-16 based on the start values stored in the EEPROM 35.

If $0 \leq \Delta Z\%$ measured$\leq \Delta Z\%$ reference, the analog signals vary, for example in linear fashion, between values of 0 and 10V. For this range, the parameters vary for example in linear or proportional fashion between the start values and end values stored in the EEPROM 35.

If $\Delta Z\%$ measured$\geq \Delta Z\%$ reference, then the analog signals may be equal to 10V and the parameters are set based on the end values stored in the EEPROM 35.

d. Control Based on Assessment Mode No. 2

In this control system, the analog signals from the digital-to-analog converter 34 are controlled by the comparison of Tmeasured with Treference and T offset, Tmeasured being provided by the software equations 33.

If Tmeasured$\leq$To, i.e. one is at the beginning of the pulse, then the analog signals are equal to 0V and the parameters are set based on the start stored in the EEPROM 35.

If To$\leq$Tmeasured$\leq$Treference, the analog signal varies for example in linear fashion between 0 and 10V and the parameters vary, for example in linear or proportional fashion, between the start values and the end values stored in the EEPROM 35.

If Tmeasured$\geq$Treference then the analogue signals may be equal to 10V and the parameters are set based on the end values stored in the EEPROM 35.

While the disclosure above is based on instantaneous readings of voltage and current, it is within the scope of this invention to control modification of certain parameters after 1 cycle or a train of cycles. Further control is not necessarily linear or proportional and may take into consideration, e.g. heavier weighing on the seniority of the last parameter change instructions established over the last cycle trains.

There are many variations within the invention herein taught and the disclosure is meant to be illustrative and not limiting.

What is claimed as invention is:

1. A process for controlling in real-time the power of penetration of a welding arc when performing the penetration pass of two parts to be joined together during welding, said welding arc produced between a welding torch of a welding machine and a metal wire, said process comprising:

a) providing an arc welding power source producing a sequential waveform of current and of voltage, in a controlled-short-circuit mode, b) measuring the instantaneous voltage and current at the welding torch, at a higher frequency than that of the welding arc, c) calculating from the instantaneous voltage and current a measure of the power of penetration of the arc when welding said penetration pass of said two parts being welded together, and d) adjusting in real-time, at least one parameter of the welding machine, said adjusting step being based on the calculated power of penetration.

2. The process, as claimed in claim 1, wherein: the process is performed for orbital butt welding of pipes.

3. The process, as claimed in claim 2, wherein: the process is performed so that the penetration pass is achieved without a backing ring.

4. The process, as claimed in claim 2, wherein: the process is performed so that the penetration pass is achieved from the outside of the two parts.

5. The process, as claimed in claim 2, wherein: the butt welding uses the MIG/MAG process.

6. The process, as claimed in claim 1, wherein: the process is performed so that said metal wire is consumed in the course of said penetration pass.

7. The process, as claimed in claim 1, wherein: there are multiple welding torches and each torch independently follows steps b, c and d.

8. The process, as claimed in claim 1, wherein: the waveform shape of voltage and current determine the measure of said calculating step.

9. The process, as claimed in claim 8, wherein: in step c, the measure of said calculating step is Z=U/I, where Z is the impedance of the wire and arc system, I is the instantaneous current in the arc, and U is the instantaneous voltage in the arc.

10. The process, as claimed in claim 9, wherein: the value of the measure of Z is an instantaneous value.

11. The process, as claimed in claim 9, wherein: the value of the measure of Z is the average value over a predesignated period.

12. The process, as claimed in claim 11, wherein: the average value of the period is an average value over a substantial portion of a pulse width of the welding machine.

13. The process, as claimed in claim 12, wherein: the average value is a weighted average.

14. The process, as claimed in claim 13, wherein: the weighted average favors more recent readings of U and I.

15. The process, as claimed in claim 9, wherein: the welding machine operation is represented by a table of operating parameters and the value of the measure of Z is compared to preset low and high values of Z.

16. The process, as claimed in claim 15, wherein: the adjustment of step d is based on values in a preset table corresponding to a value of Z.

17. The process, as claimed in claim 16, wherein: present values of Z limit the low and high values of Z in the table.

18. The process, as claimed in claim 9, wherein: the welding machine operation is represented by a table of operating parameters and the value of the measure of Z is compared to preset low and high values of Z, and the values in the table are calculated proportionally to the value of Z compared to the preset low and high values of Z for said adjustment of step d.

19. The process, as claimed in claim 8, wherein: in said step c, the measure of said calculating step is T, where T is the time from the beginning of a pulse of the machine to reaching Zmax, wherein Zmax is the highest value of impedance over the pulse duration of the machine, the impedance being equal to U divided by I, wherein U is the voltage of the welding machine and I is the current of the welding machine.

20. The process, as claimed in claim 19, wherein: the value of the measure of T is an instantaneous value.

21. The process, as claimed in claim 19, wherein: the value of the measure of T is an average value over a period.

22. The process, as claimed in claim 21, wherein: said period of averaging is an average over a substantial portion of a pulse width of the welding machine.

23. The process, as claimed in claim 22, wherein: the average value is a weighted average.

24. The process, as claimed in claim 23, wherein: the weighted average favors more recent readings of U and I.

25. The process, as claimed in claim 19, wherein: the welding machine operation is represented by a table of operating parameters and the value of the measure of T is compared to preset low and high values of T.

26. The process, as claimed in claim 25, wherein: the adjustment step d is based on values in a preset table corresponding to a value of T.

27. The process, as claimed in claim 26, wherein: present values of T limit the low and high values of T in the table.

28. The process, as claimed in claim 19, wherein: the welding machine operation is represented by a table of operating parameters and the value of the measure of T is compared to preset low and high values of T, and the values in the table are calculated proportionally to the value of T compared to the preset low and high values of T for said adjustment of step d.

29. The process, as claimed in claim 1, wherein: step d adjustment enables the assessment of the electric arc penetrating power when fit-up conditions of the two parts to be joined vary.

30. The process, as claimed in claim 1, wherein: step d adjustment enables the assessment of the electric arc penetrating power when dimensions of machined ends of the two parts to be welded vary.

31. The process, as claimed in claim 1, wherein: step d adjustment enables the assessment of the electric arc penetrating power when the welding torch is inside one of the two parts.

32. The process, as claimed in claim 1, wherein: step d adjustment enables the assessment of the electric arc penetrating power when the welding is in an upward direction.

33. The process, as claimed in claim 1, wherein: step d adjustment enables the assessment of the electric arc penetrating power when the welding is in a downward direction.

34. A process for controlling in real-time the power of penetration of a welding arc when performing the penetration pass of two parts to be joined together, from the outside of the two parts, with no backing ring, the process comprising the steps of:

a) providing an arc welding power source producing a sequential waveform of amperage and of voltage, in a controlled-short-circuit mode, b) measuring the instantaneous voltage and current at the welding torch, at a higher frequency than the frequency of the sequential waveform, with a full and detailed reading and analysis of the complete sequential waveforms of the welding arc, c) calculating from the instantaneous voltage and current a measure of the power of penetration of the arc when welding said penetration pass of said two parts being welded together, and d) monitoring and adjusting in real-time at least one electrical sequential waveforms of the power source and at least one other essential variable of the welding system, the monitoring and adjustment being based on the calculated measure of the power of penetration.

35. A system for controlling in real-time the power of penetration of a welding arc when performing the penetration pass of two parts to be joined together, said welding arc produced between a welding torch and a metal wire, said system comprising:

a) an arc welding power source producing a sequential waveform of current and of voltage, in a controlled-short-circuit mode, b) means for measuring an instantaneous and actual voltage and current at the welding torch, at a higher frequency than that of the welding arc, c) means for calculating from the instantaneous voltage and current a measure of the power of penetration of the arc when welding said penetration pass of said two parts being welded together, d) means for adjusting in real-time, at least one parameter of the system, an adjustment of the means for adjusting being based on a calculation of the means for calculating.

* * * * *